US008234327B2

(12) United States Patent
Jardetzky et al.

(10) Patent No.: US 8,234,327 B2
(45) Date of Patent: Jul. 31, 2012

(54) SYSTEM AND METHOD FOR BANDWIDTH OPTIMIZATION IN A NETWORK STORAGE ENVIRONMENT

(75) Inventors: Paul Jardetzky, San Francisco, CA (US); Steven R. Kleiman, Los Altos, CA (US); Roger Stager, Sunnyvale, CA (US); Don Trimmer, Sunnyvale, CA (US); Ling Zheng, Sunnyvale, CA (US); Yuval Frandzel, Foster City, CA (US)

(73) Assignee: NetApp, Inc., Sunnyvale, CA (US)

( * ) Notice: Subject to any disclaimer, the term of this patent is extended or adjusted under 35 U.S.C. 154(b) by 834 days.

(21) Appl. No.: 11/694,356

(22) Filed: Mar. 30, 2007

(65) Prior Publication Data

US 2008/0243992 A1    Oct. 2, 2008

(51) Int. Cl.
*G06F 15/16* (2006.01)
(52) U.S. Cl. ........................................ 709/200
(58) Field of Classification Search .......... 709/200–226; 707/10, 203, 100; 705/6, 1, 28, 26, 27, 56, 705/35, 37, 44, 10; 717/121, 126, 177, 101
See application file for complete search history.

(56) References Cited

U.S. PATENT DOCUMENTS

| | | | |
|---|---|---|---|
| 6,289,358 B1 * | 9/2001 | Mattis et al. | 707/203 |
| 7,035,911 B2 * | 4/2006 | Lowery et al. | 709/217 |
| 7,389,382 B2 * | 6/2008 | Thompson et al. | 711/118 |
| 2002/0032691 A1 * | 3/2002 | Rabii et al. | 707/200 |
| 2003/0065812 A1 * | 4/2003 | Beier et al. | 709/236 |
| 2004/0073707 A1 * | 4/2004 | Dillon | 709/245 |
| 2004/0162885 A1 * | 8/2004 | Garg et al. | 709/213 |
| 2004/0255048 A1 * | 12/2004 | Lev Ran et al. | 709/249 |
| 2006/0168118 A1 * | 7/2006 | Godlin et al. | 709/218 |
| 2006/0282618 A1 * | 12/2006 | Thompson et al. | 711/118 |
| 2007/0250552 A1 * | 10/2007 | Lango et al. | 707/205 |

OTHER PUBLICATIONS

"Notification of Transmittal of the International Search Report and the Written Opinion of the International Searching Authority, or the Declaration," International Filing Date: Mar. 19, 2008, International Application No. PCT/US2008/003613, Applicant: Network Appliance, Inc., Date of Mailing: Jul. 25, 2008, pp. 1-12.

* cited by examiner

*Primary Examiner* — Joseph Avellino
*Assistant Examiner* — Mark O Afolabi
(74) *Attorney, Agent, or Firm* — Cesari and McKenna, LLP (57) ABSTRACT

According to one or more embodiments of the present invention, a network cache intercepts data requested by a client from a remote server interconnected with the cache through one or more wide area network (WAN) links (e.g., for Wide Area File Services, or "WAFS"). The network cache stores the data and sends the data to the client. The cache may then intercept a first write request for the data from the client to the remote server, and determine one or more portions of the data in the write request that changed from the data stored at the cache (e.g., according to one or more hashes created based on the data). The network cache then sends a second write request for only the changed portions of the data to the remote server.

17 Claims, 8 Drawing Sheets

TABLE OF STORED HASHES 500

| DATA ID 505 | CORRESPONDING HASH SET 510 |
|---|---|
| DATA A | HASH SET A |
| DATA B | HASH SET B |
| ⋮ | ⋮ |
| DATA N | HASH SET N |

ENTRIES 520

SYSTEM AND METHOD FOR BANDWIDTH OPTIMIZATION IN A NETWORK STORAGE ENVIRONMENT

FIELD OF THE INVENTION

The present invention relates generally to data storage environments and, more specifically, to bandwidth optimization of data transmission in a network storage environment.

BACKGROUND OF THE INVENTION

A storage system typically comprises one or more storage devices into which information may be entered, and from which information may be obtained, as desired. The storage system includes an operating system that functionally organizes the system by, inter alia, invoking operations in support of a storage service implemented by the system. The storage system may be implemented in accordance with a variety of storage architectures including, but not limited to, a network-attached storage environment, a storage area network, and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

In particular, in accordance with a network storage environment (generally), such as a Wide Area File System (WAFS) (or distributed file system) environment, information/data may be exchanged between one or more storage systems and one or more clients over a network of communication links. In such an environment, the storage system may be embodied as a server adapted to remotely serve and forward the data to the client. For example, the clients and servers may be separated by a wide area network (WAN), such as the Internet. As those skilled in the art will understand, communication between client and server therefore involves transmission of the data over the links, utilizing an associated amount of bandwidth on those links.

Generally, network communication links for data transmission may be expensive, as will be understood by those skilled in the art. For instance, certain monetary costs may be associated with installing links and/or using links (e.g., using a service provider's installed links), such as based on an amount of data transmission (e.g., bandwidth/throughput) over those links. Accordingly, network storage environments may employ one or more storage systems configured as network caches located at or near the clients to reduce the costs associated with data transmission. In particular, network caches, generally, may be used to "cache" (store) data locally to the client, such that when a client needs the data, the data need not traverse the network from the remote server if the data is already stored at the cache. Various configurations for network caches may include "write-through" (data is always written from the client "through" the cache to the server) and "write-back" caches (data is written from client "back to" the cache, and when necessary or when more optimal, written through to the server). In a write-through cache, only read performance is optimized, since each write operation or request from the client still traverses the network to the server. In a write-back cache, read and write performance is optimized with possibly fewer read and write requests traversing the network.

While network caches may advantageously optimize (i.e., reduce) the frequency of data transmissions, the actual transmission of data to the server still requires the utilization of bandwidth through the network. As mentioned above, however, the cost of the actual transmission of data through the network may generally be expensive. On the other hand, general-purpose computational processing speeds (e.g., for central processing units, CPUs) continue to increase and their prices decrease much more rapidly than do network connection speeds and prices. (In other words, it may be less expensive to purchase faster processing resources than to pay for faster/larger network connections.) As a result, it may thus be desirable to apply the relatively inexpensive resources (e.g., computational resources) toward optimizing bandwidth utilization over networks, particularly, for example, to reduce the actual data transmissions over expensive networks.

SUMMARY OF THE INVENTION

The present invention overcomes the disadvantages of the prior art by providing a technique for optimized network bandwidth utilization in a network storage environment. The novel technique optimizes network bandwidth utilization in a network storage environment, particularly between a network cache and a remote server. By only transmitting the changed portions of cached data, traffic sent between the cache and remote server may be substantially reduced. In particular, the novel technique may conserve potentially expensive WAN link resources by utilizing relatively inexpensive computation resources.

According to one or more embodiments of the present invention, a network cache intercepts data requested by a client from a remote server interconnected with the cache through one or more wide area network (WAN) links (e.g., for Wide Area File Services, or "WAFS"). The network cache stores the data and sends/transmits the data to the client. The cache may then intercept a first write request for the data from the client to the remote server, and determine one or more portions of the data in the write request that changed from the data stored at the cache (e.g., according to one or more hashes created based on the data). The network cache then sends/transmits a second write request for only the changed portions of the data to the remote server.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

In accordance with one or more embodiments of the present invention, a technique is provided that optimizes network bandwidth utilization in a network storage environment, particularly between a network cache and a remote server. By only transmitting the changed portions of cached data, traffic sent between the cache and remote server may be substantially reduced. In particular, the novel technique may conserve potentially expensive WAN link resources by utilizing relatively inexpensive computation resources.

A. Network Storage System Environment

Figure 1:
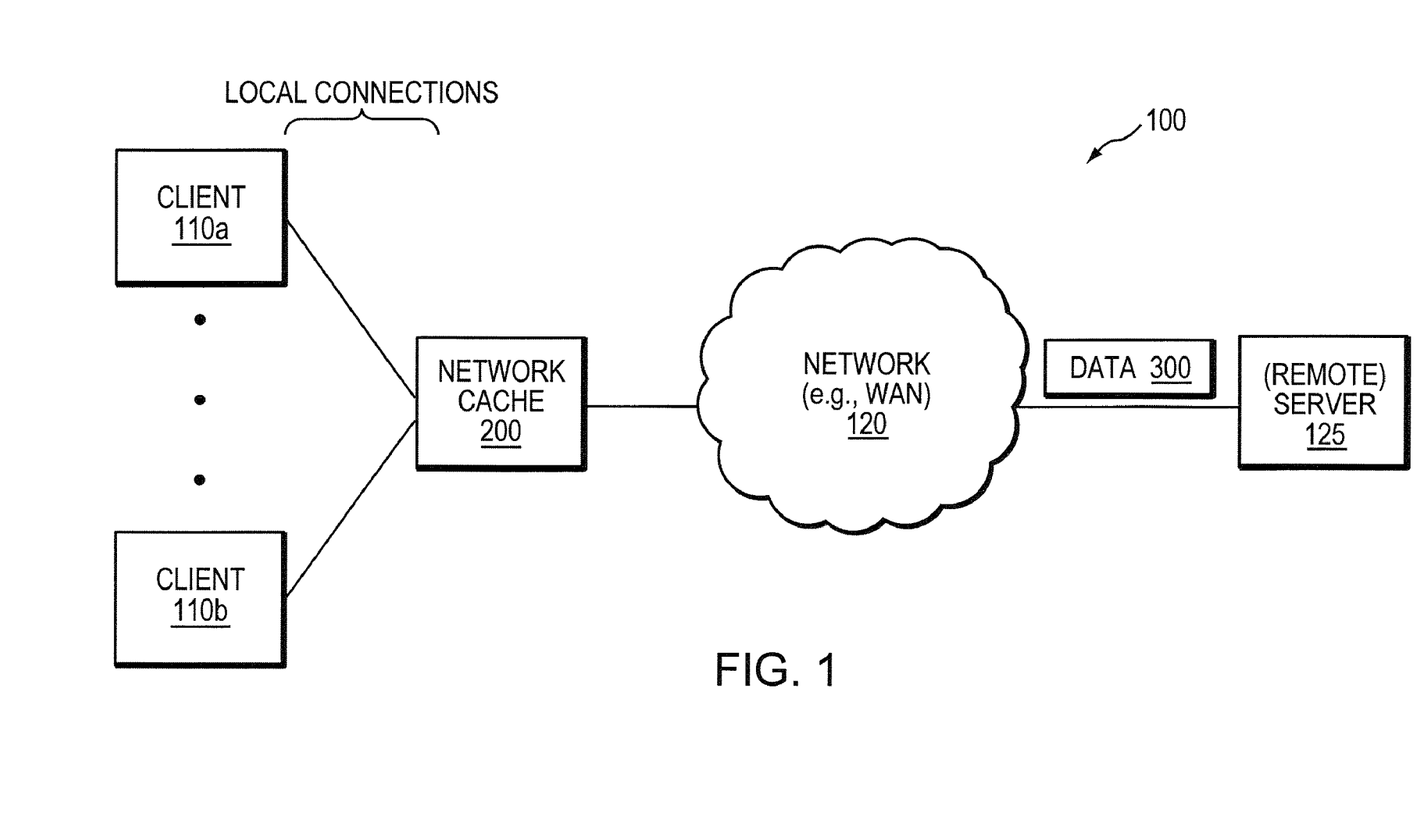
FIG. 1 is a schematic block diagram of an example network storage system environment.

FIG. 1 is a schematic block diagram of a network storage system environment 100 that may be advantageously used with the present invention, e.g., a wide area file system (WAFS). The storage system environment 100 comprises a storage system embodied as a server 125 (e.g., having one or more storage devices to store data) interconnected with one or more clients 110 by a network 120. The server 125 may be configured to operate as part of a network file system (e.g., as a network "filer"), as will be understood by those skilled in the art, to store and provide data (e.g., files) to the clients 110. Illustratively, the network 120 may be embodied as an Ethernet network, a synchronous optical network (SONET), or Frame Relay network of communication links, or, in particular, a wide area network (WAN), e.g., the Internet. Disposed between the server 125 and clients 110, specifically, between the clients and the network 120, may be a storage system configured as a network cache 200 that illustratively implements the bandwidth optimization technique of the present invention.

In operation, the server 125 remotely services data access requests (e.g., read/write requests) issued by the clients 110 over the network 120. Each client 110 may be a general-purpose computer configured to execute applications and interact with the remote server 125 in accordance with a client/server model of information delivery. That is, the client may request the services of the server, and the server may return the results of the services requested by the client, by exchanging packets over the network 120. The clients may issue packets including file-based access protocols, such as the Common Internet File System (CIFS) protocol or Network File System (NFS) protocol, over TCP/IP when accessing information, such as data, in the form of data containers, such as files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of data containers, such as blocks.

B. Network Cache System

Figure 2:
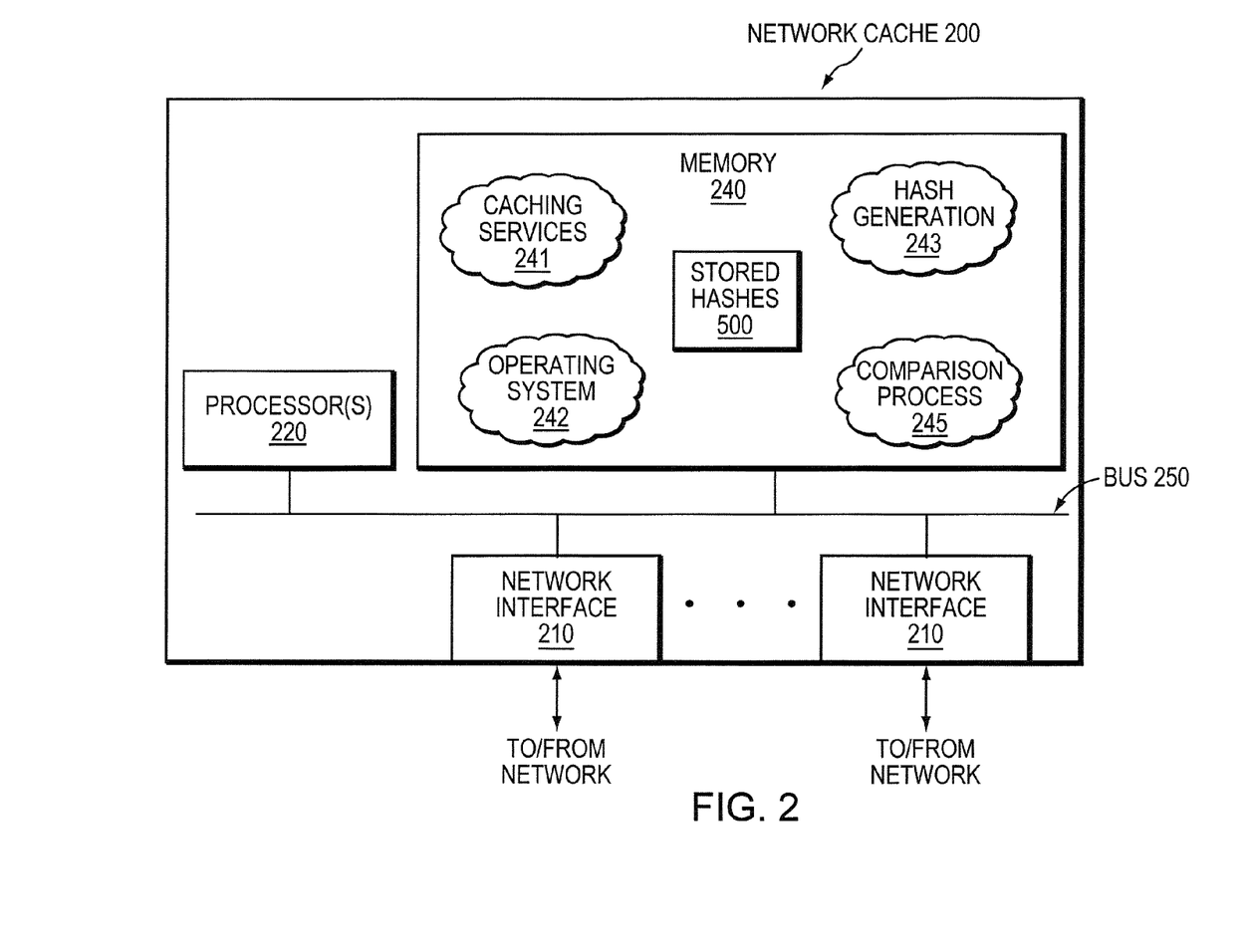
FIG. 2 is a schematic block diagram of an example cache.

FIG. 2 is a schematic block diagram of a network cache 200 that may be advantageously used with the present invention, e.g., a caching filer. Illustratively, the network cache 200 is embodied as a computer, and, as such, may comprise a plurality of network interfaces 210, one or more processors 220, and a memory 240 interconnected by a system bus 250. The network interfaces 205 contain the mechanical, electrical, and signaling circuitry for communicating data over wired/wireless links coupled to the network (storage environment) 100. The network interfaces 210 may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor(s) 220 for storing software programs and data structures associated with the embodiments described herein. The processors 220 may comprise necessary elements or logic adapted to execute the software programs and manipulate the data structures, such as a table of stored hashes 500 (described below). An operating system 242, portions of which are typically resident in memory 240 and executed by the processor(s), functionally organizes the network cache 200 by, inter alia, invoking operations in support of software processes and/or services executing on the cache. These software processes and/or services may comprise caching services 241 as well as an example hash generation process 243 and comparison process 245, each as described herein. It will be apparent to those skilled in the art that other processor and memory means, including various computer-readable media, may be used to store and execute program instructions pertaining to the inventive techniques described herein.

Caching services 241 contain computer executable instructions executed by processor(s) 220 to perform functions related to caching, generally, as will be understood by those skilled in the art. For instance, as mentioned above, caching services 241 may store data in memory (location not explicitly shown) as received from the remote server 125, such that when a client 110 requests the data, the data need not traverse the network 120 from the server if the data is already stored at the cache. Illustratively, the network cache may be configured as either a "write-through" cache or a "write-back" cache, as will be understood by those skilled in the art.

As noted above, while the use of a network cache 200 may advantageously optimize (i.e., reduce) the frequency of data transmissions (read and write requests), the actual transmission of data to and from the server 125 still requires the utilization of bandwidth through the network 120. For example, various client applications perform sequential write operations or requests of entire files where only a small percentage of the files has been changed. In such an example circumstance, it may be inefficient to transmit the unchanged percentage of the files across the network 120.

C. Bandwidth Optimization for Network Storage Environments

According to one or more embodiments of the present invention, a network cache intercepts data requested by a client from a remote server interconnected with the cache through one or more wide area network (WAN) links (e.g., for Wide Area File Services, or "WAFS"). The network cache stores the data and sends/transmits the data to the client. The cache may then intercept a first write request for the data from the client to the remote server, and determine one or more portions of the data in the write request that changed from the data stored at the cache (e.g., according to one or more hashes created based on the data). The network cache then sends/transmits a second write request for only the changed portions of the data to the remote server.

Figure 3:
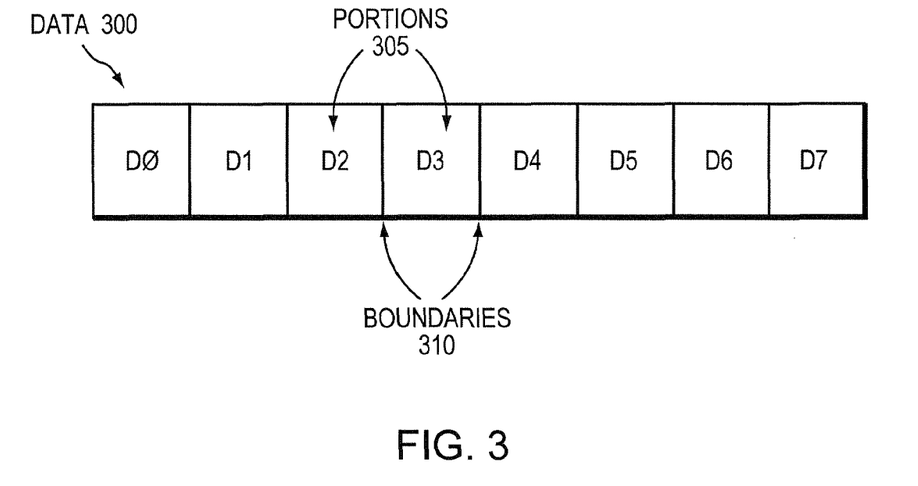
FIG. 3 is a schematic block diagram of example data.

Operationally, a client (e.g., 110a) may request a particular set of data (e.g., data and meta-data for a file) from a remote server 125, such as through a read request over network 120. The remote server 125 receives the request, and may respond with the requested data to satisfy the request. (Alternatively, the read request may originate at the network cache 200, as those skilled in the art will understand.) Illustratively, FIG. 3 is an example schematic diagram of data 300 that may be used in accordance with the present invention, e.g., returned from the remote server 125. For instance, one or more portions 305 of the data may be partitioned according to one or more corresponding data boundaries 310 (e.g., portions "D0" through "D7"). For example, the data 300 may be block-based data, such as where each portion 305 corresponds to a 4 kilobytes (KB) block of data (e.g., "4 KB block"). Alternatively, the portions 305 may be based on network packets sent over the network links. In other words, if network packets are configured to carry 1 KB of data, then the boundaries 310 may divide the data 300 into 1 KB portions.

The data 300 travels through network 120 (e.g., a WAN) from the remote server 125 toward the requesting client (e.g., client 110*a*), and is intercepted at network cache 200 located proximate to (i.e., local to) the clients 110. For example, by being physically located along the path of the data stream (i.e., receiving the data 300), the network cache 200 may intercept (or "capture") the data 300 by actively receiving the data 300, which is intended to be received by the clients 110 (e.g., thus, the network cache intercepts the data). Those skilled in the art will appreciate that in this manner, the network cache 200 operates in a conventional network cache manner. Notably, according to one or more embodiments of the present invention, the network cache 200 may be configured to selectively intercept data 300, such as particular types of data, data at particular times of day, or may be manually activated/deactivated, etc.

Figure 4:
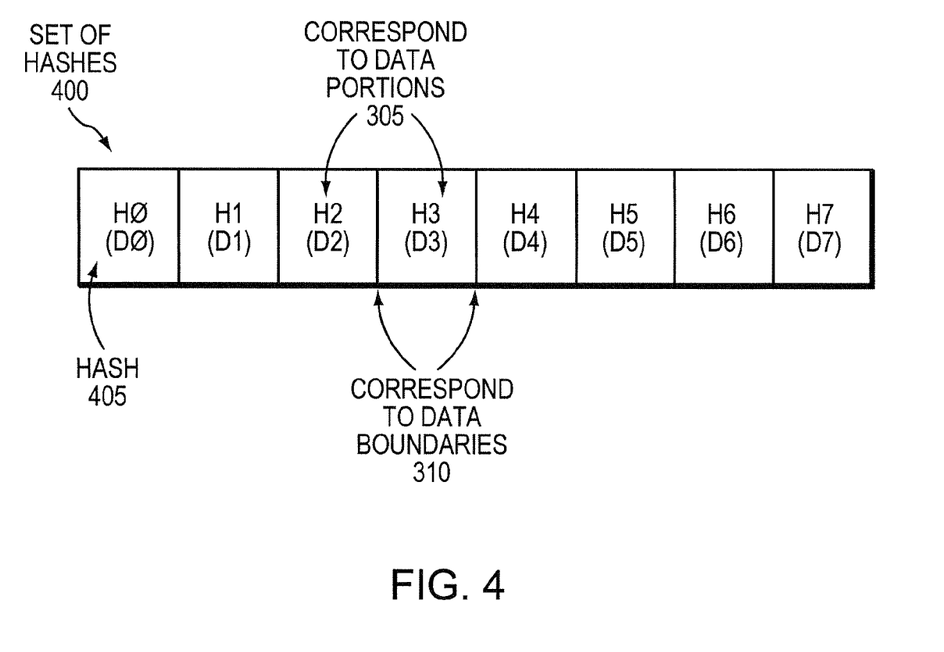
FIG. 4 is a schematic block diagram of an example set of hashes.

Upon intercepting the data, the cache may store (cache) the data, as will be understood by those skilled in the art, and send the stored data to the requesting client accordingly. In addition, the network cache 200 (e.g., hash generation process 243) may create (compute) a first set of hashes based on the intercepted data 300. Notably, the first set of hashes may be created prior to sending the data 300 to the client 110 or after sending the data to the client once the data is cached. Alternatively, the server 125 may compute the set of hashes 400 and may transmit the set along with the data to the cache 200. In this is manner, the network cache 200 may receive the first set of created hashes along with the intercepted data 300 to be stored at the cache. (Note also, that while has generation process 243 is illustratively shown as a software process, those skilled in the art will appreciate that hash generation process 243 may also be alternatively or additionally embodied as hardware.)

FIG. 4 is an example schematic diagram of a set of hashes 400 that may be used in accordance with the present invention, e.g., created for the data 300. For instance, the network cache 200 may create a set of hashes 400, where each hash 405 of the set corresponds to a data portion 305 of FIG. 3 above (e.g., "H0" corresponds to "D0", "H1" to "D1", etc.). Illustratively, the hashes may be created (e.g., by the cache 200 or remote server 125) in accordance with a one-way hashing function that operates to create no "collisions" (i.e., where substantially no two hashes are alike). As will be understood by those skilled in the art, example hashing functions may be the known "MD5" (Message Digest Algorithm 5) or "SHA1" (Secure Hash Algorithm 1) encryption functions, as well as other suitable hashing functions not specifically noted herein.

As noted, the boundaries of the hashes 405 correspond to the data boundaries 310. (While the data boundaries 310 are shown above with reference to FIG. 3, the data 300 need not be divided into portions itself, e.g., an 8 KB file may have no boundaries 310, but the hash computation configuration may divide the data into smaller portions upon which a hash is created, e.g., eight 1 KB portions.) That is, the hashes 405 each correspond to a data portion 305 that is defined by boundaries 310, which may correspond to a particular block size (e.g., 4 KB blocks), network packet size, some combination thereof, or other beneficial configuration not specifically mentioned herein but will be understood by those skilled in the art. In particular, the granularity of the hashes 405 may be adjusted (e.g., dynamically based on changing block/packet sizes) or manually (e.g., by a system administrator) to efficiently create and use the hashes as described herein. In other words, as will be appreciated by those skilled in the art, hashes corresponding to smaller portions may result in greater fine-tuning of difference detection (described below); however, there is a tradeoff between fine-tuning and the cost/time of computation/processing of the greater number of smaller hashes.

Figure 5:
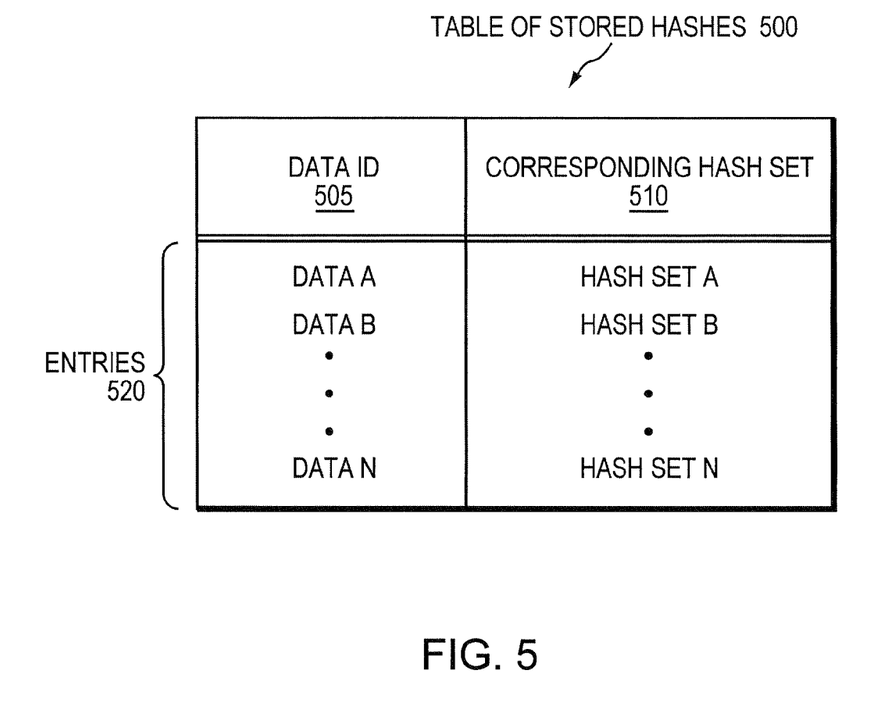
FIG. 5 is a schematic block diagram of an example table of stored hashes.

Illustratively, the sets of hashes 400 created for the intercepted data 300 from the remote server 125 may also be stored at the network cache 200, e.g., with the corresponding cached data. FIG. 5 illustrates an example table of stored hashes 500 in accordance with one or more embodiments described herein. The table of stored hashes 500 is illustratively stored in memory 240 and may include one or more entries 520, each comprising a plurality of fields, such as a data identifier (ID) field 505 and an associated/corresponding hash set field 510. The table of stored hashes 500 is illustratively maintained and managed by hash generation process 243 and/or comparison process 245. To that end, the table of stored hashes 500 maintains sets of hashes 400 (e.g., the first set of hashes) corresponding to particular instances of intercepted data 300 in accordance with the techniques as described herein. For instance, the network cache 200 may receive/intercept data identified as "Data A" through "Data N" (e.g., identified by a file name/handle, path name, or other data/meta-data as will be understood by those skilled in the art) and stored in data ID field 505, and may store correspondingly created sets of hashes "Hash Set A" through "Hash Set N" in the hash set field 510 of the table 500 (that is, storing sets of hashes 400 in hash set field 510).

As mentioned above, the network cache 200 forwards the intercepted data to the requesting client 110*a*. The client may process the data, as will be understood by those skilled in the art (e.g., accesses, reads, opens, modifies, etc.), and (if the data does not correspond to a read-only file) may send a first write request for the data toward the remote server 125 (or, if configured to be so aware, directly to the cache 200). The network cache 200 may then intercept (or receive) the first write request, and create a second set of hashes 400 of the data 300 in the write request using whichever hash function that was used to create the first set of hashes 400 above. For example, if MD5 was used on the data at boundaries corresponding to 4 KB blocks to create the first set of hashes, then the second set of hashes is created using MD5 on 4 KB blocks.

Figure 6:
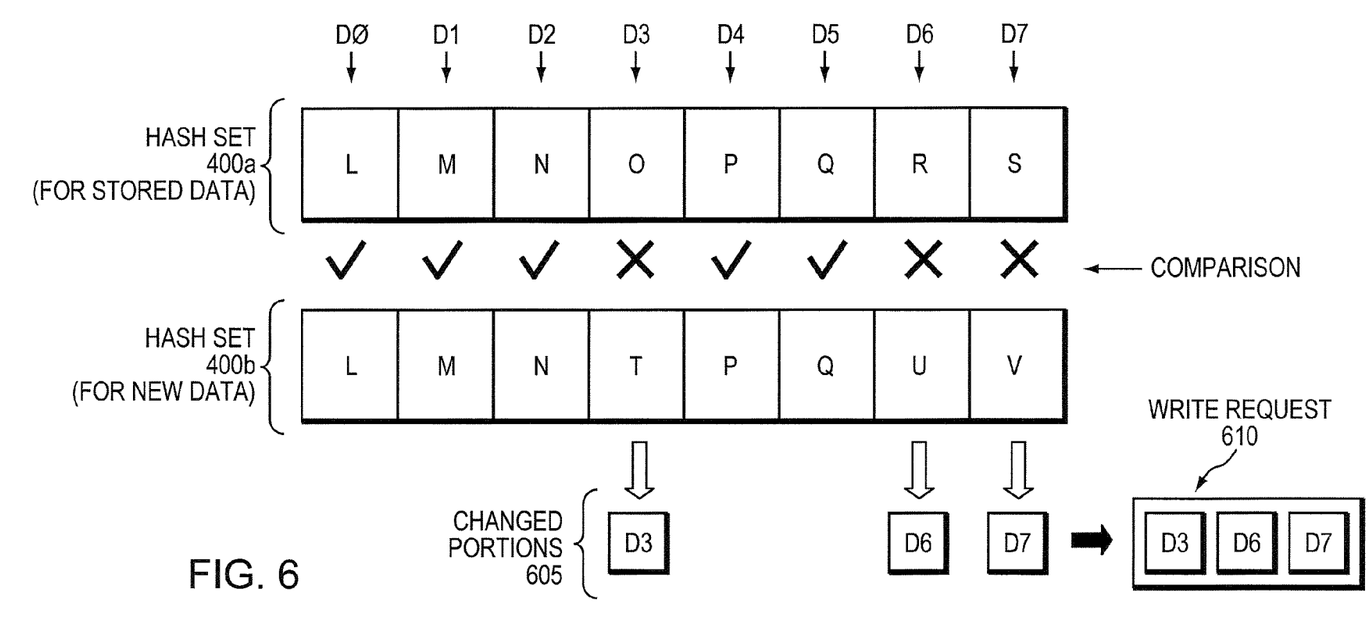
FIG. 6 is a schematic block diagram of an example comparison between two example sets of hashes.

Once the second set of hashes is created, the network cache 200 (e.g., comparison process 245) may compare the first and second sets of hashes 400 to determine whether there are any differences. For example, FIG. 6 illustrates a schematic diagram of a comparison operation between two example sets of hashes 400 in accordance with the present invention. The first set of hashes 400*a* created from the intercepted data 300 from the remote server (the stored/cached data) may have hashes H0-H7 that correspond respectively to "L, M, N, O, P, Q, R, S". (Those skilled in the art will understand that the use of simple letters is merely for illustrative purposes, and that actual hashes are generally far more complex.) The second set of hashes 400*b* created from the received data in the first write request from the client may have hashes H0-H7 that correspond respectively to "L, M, N, T, P, Q, U, V". If the first and second sets of hashes 400 match, there is no need to transmit that corresponding portion of data 305 over the network since the portion has not changed (e.g., portions D0-D2, and D4-D5). Those hashes that are different upon comparison, however, denote a change in those corresponding portions of data, and such portions are sent to the remote server 125 over the network 120 accordingly (e.g., portions D3 and D6-D7).

Upon completion of the comparison, in accordance with the present invention, the network cache 200 may generate and send a second write request (e.g., 610) to the remote server 125 (on behalf of the client 110a) that contains only the data portions that have changed (e.g., D3, D6, and D7). The remote server 125 may be configured to receive such "partial" write requests, and updates the copy of the data 300 stored at the server with the changed data (e.g., updates the data portions D3 and D6-D7). In this manner, transmission of the data across the network 120 is reduced to those portions that have changed (to those whose new hashes do not match the stored hashes). As the remainder of the data has not changed (new hashes match the stored hashes), the unchanged data does not need to be re-written (i.e., transmitted) to the server. Accordingly, network traffic is reduced, and bandwidth is efficiently optimized.

As noted, the data portion size may be adjusted (or pre-configured) to allow for an efficient use and application of resources. For instance, it may be appreciated that a single hash for the entire data 300 may be considered inefficient, as a change of a single bit (e.g., a date-stamp) may result in all of the data being transmitted to the server (i.e., the changed portion). Conversely, a hash created for each bit of the data may result in an extreme computational burden, and thus may also be considered inefficient.

Moreover, for write-back caches, the techniques described herein may be applied at the network cache 200 prior to sending the second write request to the remote server 125, but not necessarily each time a first write request for the data is received from the client 110a. In particular, because a write-back cache typically only sends data over the network 120 when possible/desired, only the data to be actually sent to the remote server needs to be compared with the original stored data intercepted from the remote server (i.e., what the remote server should currently contain for the data). Write-through caches, on the other hand, typically send the data to the remote server upon each write request from the client, and as such, would benefit from performing the comparison for each request, accordingly.

Figure 7:
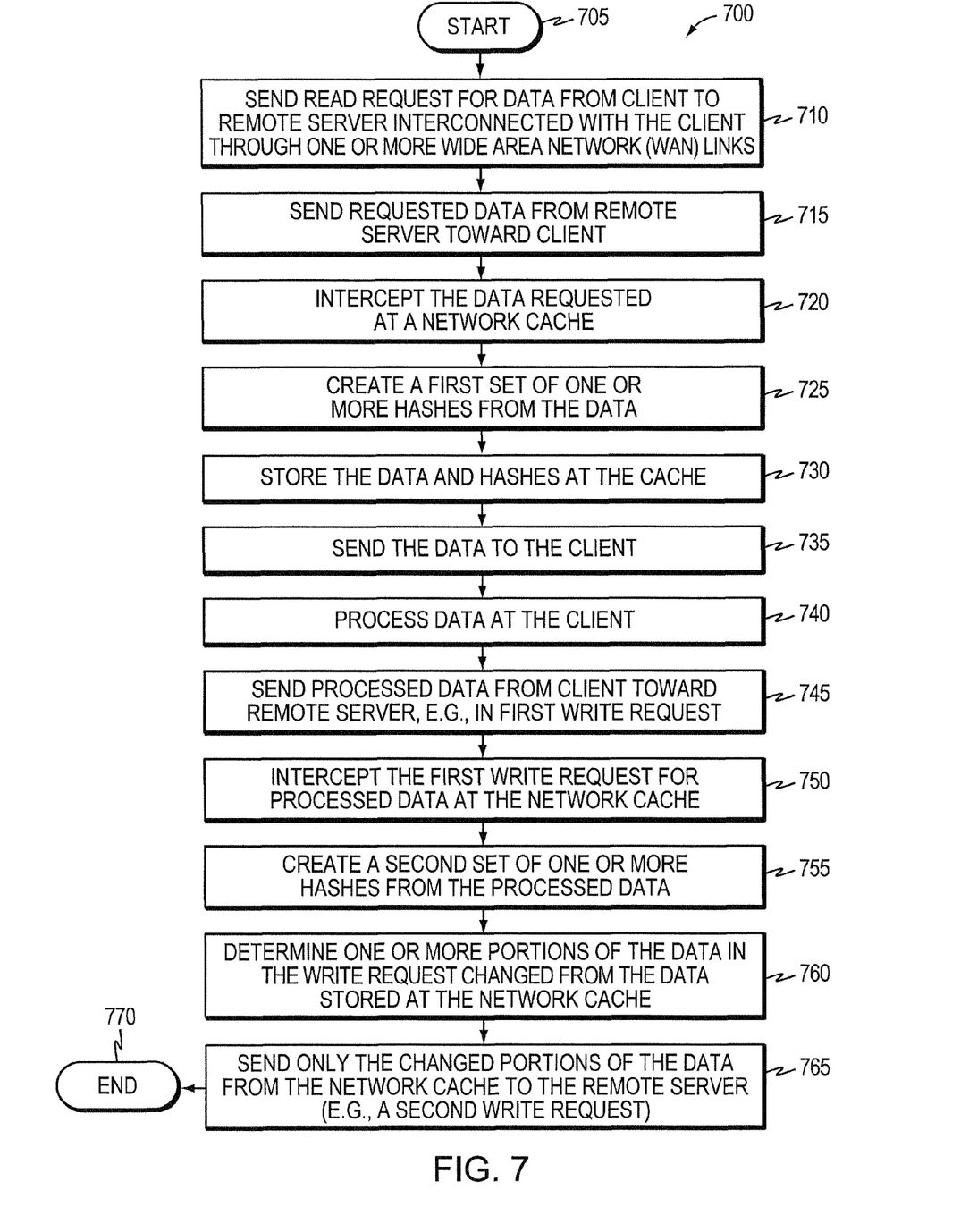
FIG. 7 is a flowchart of example steps for optimizing bandwidth utilization in a network storage environment in accordance with the present invention.
Figure 8:
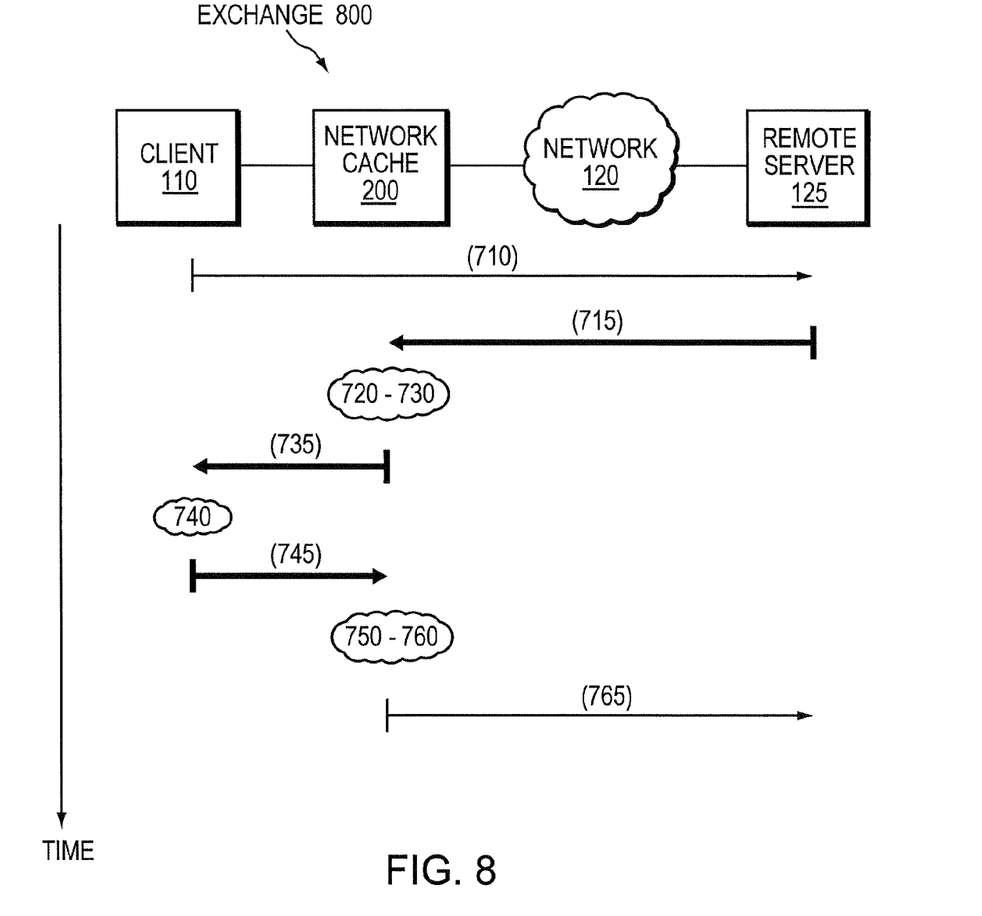
FIG. 8 is an example data exchange/handling sequence in accordance with the flowchart of FIG. 7.

FIG. 7 is a flowchart detailing the steps of a procedure 700 for optimizing bandwidth utilization in a network storage environment in accordance with an illustrative embodiment of the present invention. Also, FIG. 8 illustrates an example data exchange/handling sequence 800 in accordance with the steps of FIG. 7. The procedure 700 (and illustrative sequence 800) begins in step 705 and continues to step 710 where a client (e.g., 110a) sends a read request for data (e.g., Data A) to a remote server 125 interconnected with the client through one or more network (e.g., WAN) links 120. In response, the server 125 sends the requested data (Data A) toward the client 110a in step 715.

In step 720, the network cache 200 intercepts the requested data (and caches it), and hash generation process 243 correspondingly creates a first set (e.g., 400a) of one or more hashes from the data in step 725, as described above. The cache 200 then stores the data and hashes (e.g., in stored hashes table 500) in step 730, and sends the data (Data A) to the client 110a as originally intended in step 735. (Notably, while the steps shown herein illustrate creating the hash prior to sending the data to the client, embodiments of the present invention may alternatively send the data to the client once the data is cached, and may perform the hashing operations afterward.) In step 740, the client may receive and process the data, and may subsequently send the processed data toward the remote server 125 in step 745, e.g., in a first write request.

In step 750, the network cache 200 intercepts the processed data (the first write request), and creates a second set (400b) of one or more hashes from the processed data in step 755 (e.g., hash generation process 243). With both the first and second sets of hashes for the data (Data A) (or, as mentioned above, with both sets of data), the comparison process 245 of the cache may determine, in step 760, one or more portions 305 of the data in the write request changed from the data stored at the cache. Accordingly, as described above, the network cache 200 may send only the changed portions 605 of the data to the remote server 125 (e.g., a second write request, 610) in step 765, thus potentially reducing (optimizing) network bandwidth utilization across network 120. The procedure 700 then ends in step 770.

Advantageously, the novel technique optimizes network bandwidth utilization in a network storage environment, particularly between a network cache and a remote server. By only transmitting the changed portions of cached data, traffic sent between the cache and remote server may be substantially reduced. In particular, the novel technique may conserve potentially expensive WAN link resources by utilizing relatively inexpensive computation resources.

In other words, through the techniques described herein, such as utilizing block/packet-based hashes and a differencing engine (comparing process 245), the network cache 200 may advantageously decide if and when to transmit a particular portion of data across the network. Accordingly, the present invention effectively optimizes bandwidth utilization for network storage environments, particularly for network caches 200, by avoiding transmission of "duplicate data" (data not changed and already stored on the cache and remote server) for a write request. Notably, those skilled in the art will appreciate that while data de-duplication technology is available to avoid storage of duplicate data, the techniques described herein may be particularly used to reduce transmission of unnecessary (duplicate) data across a network.

While there have been shown and described illustrative embodiments that optimize network bandwidth utilization in a network storage environment, it is to be understood that various other adaptations and modifications may be made within the spirit and scope of the present invention. For example, the embodiments have been shown and described herein showing a network cache 200 that is separate from the clients 110 (e.g., separately connected via one or more LAN links). However, the embodiments of the invention in their broader sense are not so limited, and may, in fact, be applicable to caches that are co-located within the clients 110. Further, while the above description utilizes WAN links for the network communication links, it should be noted that the network storage environment may utilize any network links generally (e.g., LAN links, wireless links, etc.) that may be used to interconnect separate nodes/devices, e.g., clients, caches, servers, etc. Also, while the above description utilizes (e.g., creates and compares) hashes corresponding to the data to determine differences, the stored data and the data of the write request may be directly compared without a need for hashes. Those skilled in the art will understand that it many cases hashes may be substantially smaller in size than the actual data (e.g., a 128-bit MD5 hash that corresponds to a 4K block of data), and thus may be more efficiently compared.

Furthermore, while this description has been written in terms of reducing data sent over communication links, the principles of the present invention may be utilized to provide bandwidth optimization within a single node/device. In such an alternate embodiment, the above-described caching technique may be used to minimize the amount of bandwidth utilized in transmitting data within the device (e.g., on a system bus 250), should such a configuration be advantageous.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   intercepting, at a cache having a processor, data requested by a client from a server, wherein the cache is operatively interconnected between the client and the server through one or more network communication links;
   in response to intercepting the requested data at the cache, storing the requested data at the cache;
   creating a first set of hashes of the requested data stored at the cache;
   sending the requested data from the cache to the client to process the requested data;
   intercepting, at the cache, a first write request from the client to the server directed to the processed data, the first write request changing the processed data;
   creating a second set of hashes of the changed processed data associated with the first write request;
   determining, by the cache that intercepted the requested data and the first write request, one or more portions of the changed processed data associated with the first write request that changed from the requested data intercepted by the cache and stored at the cache by comparing the first and second set of hashes; and
   sending a second write request for the one or more portions of the changed processed data that changed from the cache to the server.

2. The method as in claim 1, wherein each hash of a set of hashes corresponds to a particular portion of the requested data.

3. The method as in claim 2, wherein a different hash indicates a changed portion of the data.

4. The method as in claim 1, further comprising:
   creating the first and second set of hashes with a one-way hashing function.

5. The method as in claim 4, wherein the one-way hashing function is selected from the group consisting of: Message-Digest Algorithm (MD5) and secure hash algorithm (SHA) 1.

6. The method as in claim 1, further comprising:
   receiving, at the cache, the first set of created hashes along with the intercepted requested data to be stored at the cache.

7. The method as in claim 1, wherein the cache is connected to the client and the server through one or more local area network (LAN) communication links.

8. The method as in claim 1, wherein the communication links are wide area network (WAN) links, the method further comprising:
   operating the cache, client, and server in accordance with Wide Area File Services (WAFS).

9. The method as in claim 1, wherein the data is a file.

10. The method as in claim 1, wherein the one or more portions of the changed processed data are blocks.

11. The method as in claim 10, wherein the blocks are 4 KB blocks.

12. The method as in claim 1, wherein the one or more portions of the changed processes data are based on network packets over the links.

13. The method as in claim 1, wherein the cache is a write-through cache.

14. The method as in claim 1, wherein the cache is a write-back cache.

15. A system, comprising:
   a remote server configured to send data;
   a network cache having a processor and operatively interconnected between the remote server and a client through one or more wide area network (WAN) links, the network cache configured to intercept the data sent from the remote server and requested by the client, store the data, and send the requested data to the client; and
   the client configured to receive the requested data from the network cache, process the data, and send a first write request directed to the processed data to the remote server;
   wherein the network cache, that intercepted the requested data from the remote server, is further configured to intercept the first write request, determines one or more portions of the processed data associated with the write request that changed from the requested data stored at the cache based on a comparison of a first set of hashes of the requested data and a second set of hashes of the processed data associated with the first write request, and send a second write request for the portions of the processed data that changed to the remote server.

16. The system as in claim 15, wherein the network cache is further configured to create the first set of hashes of the requested data stored at the cache and create the second set of hashes of the processed data in the write request.

17. A method, comprising:
   receiving, by a cache, data requested by a client from a remote server, wherein the cache is operatively interconnected between the client and the remote server through one or more network links;
   creating, by the cache that received the data requested by the client from the remote server, a first set of hashes of the data, each hash of the set corresponding to a portion of the data;
   storing the first set of hashes at the cache;
   processing the data at the client;
   issuing, by the client, a first write request associated with the processed data to the remote server;
   intercepting, by the cache, the first write request associated with the processed data;
   creating, by the cache, a second set of hashes of the processed data associated with the first write request;
   determining, by the cache, one or more hashes of the second set of hashes that are different from the first set of hashes, wherein a different hash indicates a changed portion of data; and
   sending, by the cache that received the data, created the first set of hashes, intercepted the first write requested, created the second set of caches, and determined the one or more hashes of the second set of hashes that are different from the first set of hashes, a second write request associated with the one or more changed portions of the data from the cache to the remote server.

* * * * *

UNITED STATES PATENT AND TRADEMARK OFFICE
CERTIFICATE OF CORRECTION

PATENT NO. : 8,234,327 B2
APPLICATION NO. : 11/694356
DATED : July 31, 2012
INVENTOR(S) : Paul Jardetzky et al.

It is certified that error appears in the above-identified patent and that said Letters Patent is hereby corrected as shown below:

Col. 10, line 4 should read: "portions of the changed ~~processes~~processed data are based on network"

Col. 10, line 23 should read: "intercept the first write request, determine~~determines~~ one or more"

Signed and Sealed this
Fourth Day of December, 2012

David J. Kappos
*Director of the United States Patent and Trademark Office*